US010788332B2

(12) United States Patent
DeLuca et al.

(10) Patent No.: US 10,788,332 B2
(45) Date of Patent: Sep. 29, 2020

(54) ROUTE NAVIGATION BASED ON USER FEEDBACK

(71) Applicant: International Business Machines Corporation, Armonk, NY (US)

(72) Inventors: Lisa Seacat DeLuca, Baltimore, MD (US); Shelbee D. Eigenbrode, Thornton, CO (US); Dana L. Price, Surf City, NC (US); Aaron J. Quirk, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 15/834,489

(22) Filed: Dec. 7, 2017

(65) Prior Publication Data

US 2019/0178671 A1 Jun. 13, 2019

(51) Int. Cl.
*G01C 21/36* (2006.01)
*G10L 15/22* (2006.01)
*G10L 13/04* (2013.01)
G10L 13/027 (2013.01)
G10L 15/26 (2006.01)

(52) U.S. Cl.
CPC ..... *G01C 21/3608* (2013.01); *G01C 21/3602* (2013.01); *G01C 21/3617* (2013.01); *G01C 21/3641* (2013.01); *G10L 13/043* (2013.01); *G10L 15/22* (2013.01); *G10L 13/027* (2013.01); *G10L 15/26* (2013.01); *G10L 2015/223* (2013.01)

(58) Field of Classification Search
USPC .................................................. 701/400–533
See application file for complete search history.

(56) References Cited

U.S. PATENT DOCUMENTS

| 5,177,685 | A | * | 1/1993 | Davis | ................ | B60R 16/0373 |
| | | | | | | 340/988 |
| 5,508,930 | A | * | 4/1996 | Smith, Jr. | .......... | G01C 21/3415 |
| | | | | | | 340/988 |
| 6,172,641 | B1 | * | 1/2001 | Millington | ............. | G01C 21/26 |
| | | | | | | 340/996 |
| 6,182,010 | B1 | | 1/2001 | Berstis | | |
| 6,556,970 | B1 | * | 4/2003 | Sasaki | ................ | G01C 21/3608 |
| | | | | | | 382/100 |
| 7,064,681 | B2 | * | 6/2006 | Horstemeyer | .......... | H04L 63/08 |
| | | | | | | 340/994 |

(Continued)

*Primary Examiner* — Jonathan L Sample
(74) *Attorney, Agent, or Firm* — Michael Petrocelli; Madeline F. Schiesser; Keohane & D'Alessandro, PLLC

(57) ABSTRACT

Approaches presented herein enable improving electronic (e.g., GPS) navigation for a user operating a vehicle based on feedback from the user. More specifically, a verbal comment is obtained from the user and is analyzed for a navigation instruction delivery preference. A profile associated with navigation of the vehicle, which can include a user profile, a location profile, or an ambient environment profile, is modified based on the navigation instruction delivery preference. Based on the profile associated with navigation of the vehicle, a navigation instruction is synthesized and provided to the user. A dialogue can be solicited with the user to obtain additional comments from the user, based upon which the profile associated with navigation of the vehicle can be further modified.

20 Claims, 6 Drawing Sheets

(56) References Cited

U.S. PATENT DOCUMENTS

| | | | |
|---|---|---|---|
| 7,561,069 B2 * | 7/2009 | Horstemeyer | G06Q 10/06311 340/994 |
| 7,912,637 B2 * | 3/2011 | Horvitz | G01C 21/3476 701/33.4 |
| 8,108,083 B2 * | 1/2012 | Kameyama | G01C 21/3641 701/1 |
| 8,301,374 B2 | 10/2012 | Surampudi et al. | |
| 9,261,376 B2 | 2/2016 | Zheng et al. | |
| 9,426,225 B2 * | 8/2016 | Penilla | G06Q 50/06 |
| 9,651,395 B2 | 5/2017 | Rosario | |
| 2004/0143440 A1 * | 7/2004 | Prasad | B60R 16/0373 704/270 |
| 2005/0209776 A1 | 9/2005 | Ogino | |
| 2005/0288859 A1 | 12/2005 | Golding et al. | |
| 2006/0015249 A1 * | 1/2006 | Gieseke | G08G 1/096866 701/416 |
| 2007/0010942 A1 * | 1/2007 | Bill | G01C 21/3617 701/424 |
| 2008/0027632 A1 * | 1/2008 | Mauderer | G09B 29/102 701/532 |
| 2008/0319660 A1 | 12/2008 | Horvitz et al. | |
| 2010/0070161 A1 * | 3/2010 | Harris | G01C 21/20 701/533 |
| 2011/0054791 A1 | 3/2011 | Surampudi et al. | |
| 2011/0208429 A1 | 8/2011 | Zheng et al. | |
| 2012/0078509 A1 * | 3/2012 | Choi | G01C 21/3415 701/423 |
| 2013/0024017 A1 * | 1/2013 | Whikehart | B60R 16/0373 700/94 |
| 2013/0311081 A1 * | 11/2013 | Yamakawa | G01C 21/36 701/428 |
| 2014/0074483 A1 * | 3/2014 | van Os | G06F 3/167 704/275 |
| 2014/0142849 A1 * | 5/2014 | Ziezold | G01C 21/3644 701/533 |
| 2015/0112593 A1 * | 4/2015 | Kandangath | G01C 21/3644 701/541 |
| 2015/0168174 A1 * | 6/2015 | Abramson | G01C 21/3626 701/408 |
| 2015/0168175 A1 * | 6/2015 | Abramson | G01C 21/34 701/408 |
| 2016/0018237 A1 | 1/2016 | Rosario | |
| 2016/0205238 A1 * | 7/2016 | Abramson | G01C 21/3641 455/456.4 |
| 2016/0216130 A1 * | 7/2016 | Abramson | G01C 21/3423 |
| 2016/0216131 A1 | 7/2016 | Khorana | |
| 2016/0231132 A1 * | 8/2016 | Maiwand | G01C 21/36 |
| 2017/0314954 A1 * | 11/2017 | Golding | G01C 21/3602 |
| 2019/0115016 A1 * | 4/2019 | Seok | G10L 15/22 |

* cited by examiner

ROUTE NAVIGATION BASED ON USER FEEDBACK

TECHNICAL FIELD

The present invention relates generally to electronic navigation systems and, more specifically, to improving an electronic system for a user based on feedback from the user.

BACKGROUND

Many people use Global Positioning system (GPS) navigation in their everyday lives. GPS-based navigation can, for example, be part of a mobile device carried by a person or can be performed by a standalone system installed in a vehicle. In any case, GPS-based navigation can be a useful tool in navigating a vehicle, as GPS-based navigation can provide both the current location of the vehicle as well as a destination location relative to the current location of the vehicle. Navigation systems often rely on this information to provide the operator of a vehicle with a set of directions to navigate the vehicle from the current location of the vehicle to the destination location.

However, understanding directions from a navigation system in an unfamiliar and/or heavily trafficked area can be difficult for a vehicle operator using the navigation system. When the vehicle operator fails to initially understand directions from the navigation system, the vehicle operator may make navigational errors, for which the navigational system must then compensate by calculating a new navigational route based on the now erroneous position of the vehicle. Misunderstood directions can make current navigation systems operate inefficiently and/or can make confused vehicle operators a danger to themselves and to others.

Some techniques that navigation systems currently use to help a vehicle operator as he or she navigates with a navigation system include referencing known landmarks, businesses, street signs, and real-time maps. Yet, even with such tools available to assist a vehicle operator in navigating unknown areas, there are still many sources of potential confusion on the part of the vehicle operator. For example: a landmark or business referenced in a direction from the navigation system may not be obvious or apparent to the vehicle operator; signs may be covered, at an awkward height, or otherwise obscured; or it may be difficult to gauge distances. Furthermore, a vehicle operator may struggle to keep his or her eyes on the road while simultaneously attempting to interpret a map shown on a display of the navigation system. As a result, even with navigation system assistance, it is very possible for a vehicle operator still to miss the street, exit, or other location for which he or she is looking.

Therefore, there is a need for a navigation guidance system that can provide navigation instructions to a vehicle operator that are optimized to prevent confusing the vehicle operator based on both the vehicle operator and the surrounding environment in which he or she is operating the vehicle.

SUMMARY

Approaches presented herein improve electronic (e.g., GPS) navigation by improving electronic navigation for a user operating a vehicle based on feedback from the user. More specifically, a verbal comment is obtained from the user and is analyzed for a navigation instruction delivery preference. A profile associated with navigation of the vehicle, which can include a user profile, a location profile, or an ambient environment profile, is modified based on the navigation instruction delivery preference. Based on the profile associated with navigation of the vehicle, a navigation instruction is synthesized and provided to the user. A dialogue can be solicited with the user to obtain additional comments from the user, based upon which the profile associated with navigation of the vehicle can be further modified.

One aspect of the present invention includes a method for improving electronic navigation for a user operating a vehicle based on feedback from the user. The method comprises obtaining a verbal comment from the user and analyzing the verbal comment for a navigation instruction delivery preference. The method further comprises modifying a profile associated with navigation of the vehicle based on the navigation instruction delivery preference. Additionally, the method comprises synthesizing a navigation instruction with which to provide the user based on the profile and providing the user with the synthesized navigation instruction. This method offers the advantage of providing a user operating a vehicle with navigation instructions delivered in a manner preferable to the user.

The method may optionally further include synthesizing an inquiry directed at the user responsive to an action of the user, the action associated with the provided navigation instruction. This method offers the advantage of opening a dialogue between a navigation system and the user, allowing the system to obtain feedback from the user.

In addition to the above, the method may optionally further include obtaining a second verbal comment from the user responsive to the inquiry and modifying the profile associated with navigation of the vehicle by the user based on the second verbal comment. This method further offers the advantage of continuing a dialogue between a navigation system and the user, allowing the system to obtain feedback from the user.

The navigation instruction delivery preference of the method may optionally also include a limitation of the user or a limitation of an environment in which the vehicle operated by the user is situated. This method offers the advantage of identifying preferences and limitations of the user to tailor messages to preferences and away from limitations.

In addition to the above, the method may optionally further include adding the limitation of the user to the profile associated with navigation of the vehicle by the user, the profile being a profile associated with the user. This method offers the advantage of storing information about a user in a profile which can be accessed later, permitting continuous refinement of information known about the user's driving.

The method may optionally further include determining whether the limitation of the environment is a continuing limitation of the environment or a temporary limitation of the environment. This method may further include adding, in the case that the limitation of the environment is a continuing limitation of the environment, the limitation of the environment to the profile associated with navigation of the vehicle by the user, the profile being a location profile associated with a current location of the user, and the location profile being stored in association with the environment. Alternatively, this method may further include adding, in the case that the limitation of the environment is a temporary limitation of the environment, the limitation of the environment to the profile associated with navigation of the vehicle by the user, the profile being an ambient environment profile associated with a current environment of the user, the ambient environment profile being created temporarily for an instance of operation of the vehicle by the user. This method offers the advantage of incorporating the features of a surrounding environment into a profile for optimizing navigation instruction delivery.

The method may optionally further include obtaining visual information in real time about an environment in which the vehicle operated by the user is situated. Thus method may also include adding the obtained visual information to the profile associated with navigation of the vehicle and referencing the obtained visual information in the synthesized navigation instruction. This method offers the advantage of being able to reference current happenings around a vehicle operated by a user when customizing navigation instructions to the user.

Another aspect of the present invention includes a computer system for improving electronic navigation for a user operating a vehicle based on feedback from the user, the computer system comprising: a memory medium comprising program instructions; a bus coupled to the memory medium; and a processor, for executing the program instructions, coupled to a navigation instruction tailoring engine via the bus that when executing the program instructions causes the system to: obtain a verbal comment from the user; analyze the verbal comment for a navigation instruction delivery preference; modify a profile associated with navigation of the vehicle based on the navigation instruction delivery preference; synthesize a navigation instruction with which to provide the user based on the profile; and provide the user with the synthesized navigation instruction.

Yet another aspect of the present invention includes a computer program product for improving electronic navigation for a user operating a vehicle based on feedback from the user, the computer program product comprising a computer readable hardware storage device, and program instructions stored on the computer readable hardware storage device, to: obtain a verbal comment from the user; analyze the verbal comment for a navigation instruction delivery preference; modify a profile associated with navigation of the vehicle based on the navigation instruction delivery preference; synthesize a navigation instruction with which to provide the user based on the profile; and provide the user with the synthesized navigation instruction.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
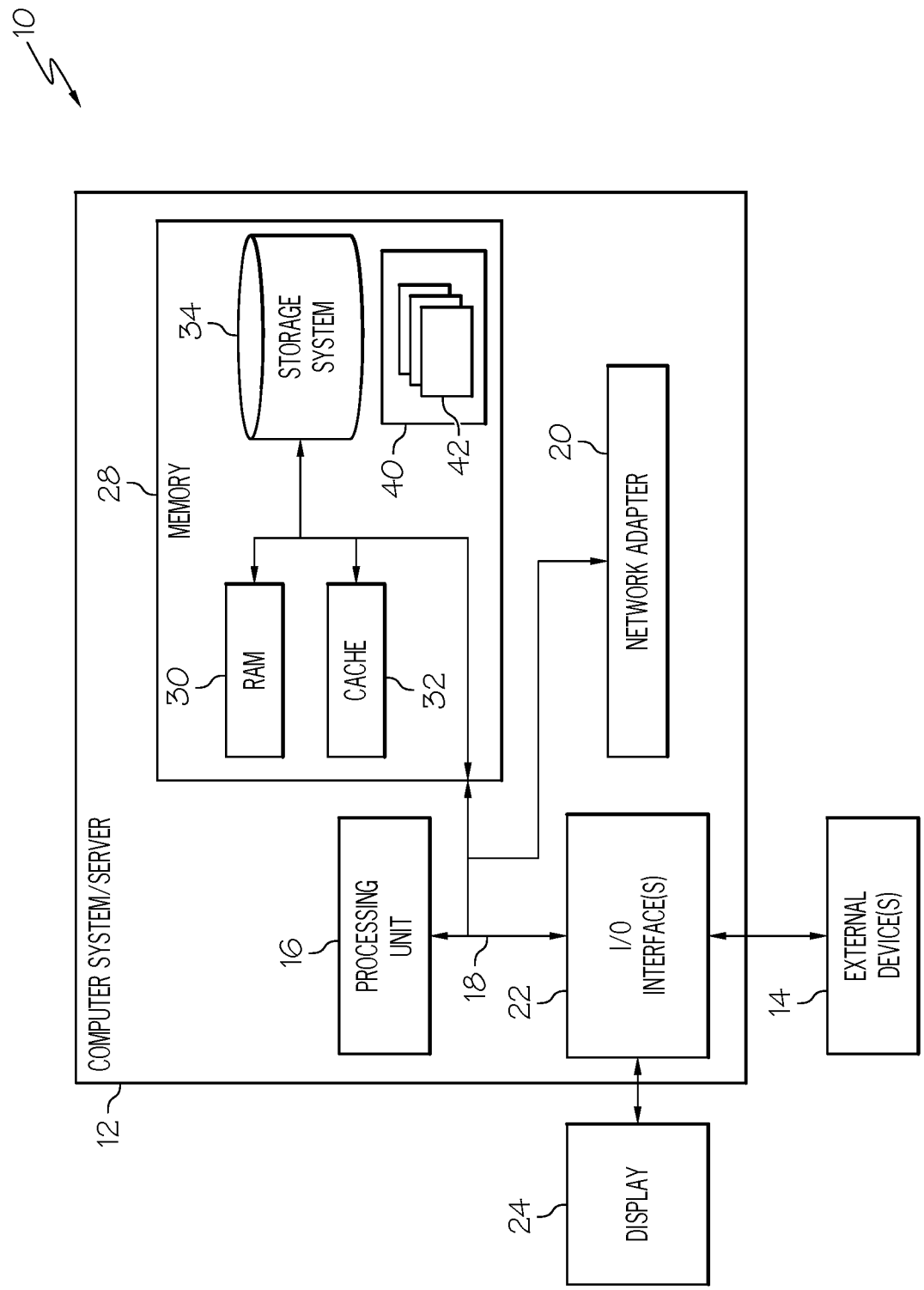
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for improving electronic (e.g., GPS) navigation for a user operating a vehicle based on feedback from the user. More specifically, a verbal comment is obtained from the user and is analyzed for a navigation instruction delivery preference. A profile associated with navigation of the vehicle, which can include a user profile, a location profile, or an ambient environment profile, is modified based on the navigation instruction delivery preference. Based on the profile associated with navigation of the vehicle, a navigation instruction is synthesized and provided to the user. A dialogue can be solicited with the user to obtain additional comments from the user, based upon which the profile associated with navigation of the vehicle can be further modified.

Referring now to FIG. 1, a computerized implementation 10 of an embodiment for improving electronic navigation for a user operating a vehicle based on feedback from the user will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for improving electronic navigation for a user operating a vehicle based on feedback from the user. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for improving electronic navigation for a user operating a vehicle based on feedback from the user, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that understanding and successfully following directions from a navigation system in an unfamiliar and/or heavily trafficked area can be difficult for a vehicle operator, resulting in navigational errors, for which the navigational system must compensate by recalculating a navigation route. This process can be inefficient for both the navigation system as well as the user who, in his or her confusion, may increase the risk of an accident on the road. Techniques currently used to direct a vehicle operator rely on the ability of the vehicle operator to be able to see and read signs, judge distances, and identify landmarks in his or her vicinity. Therefore, this system that relies on the vehicle operator to successfully interpret directions is weakened by human errors and limitations. As a result, even with navigation system assistance, it is possible for a vehicle operator to still miss the street, exit, or other location for which he or she is looking.

Accordingly, the inventors of the present invention have developed a system that improves existing electronic navigation systems by tailoring navigation directions from a navigation system to a user by learning from the user which navigation instruction delivery techniques work well for the user and which do not. The system of the present invention further can profile the user, the conditions in which he or she is driving, and the location in which he or she is driving and use an aggregation of these profiles to identify an optimal navigation instruction delivery technique for the user under specific given circumstances. This allows the system to modify navigation instructions not only based on current conditions, but also based on previous successes. Moreover, the system developed by the inventors can continue to dynamically learn from the user by opening a dialogue with the user while the user is using the navigation system.

Furthermore, embodiments of the present invention offer several advantages for providing navigation instructions to the operator of a vehicle. Such advantages include, but are not limited to, a reduction in navigation errors, which allows the provision of directions to a user be more efficient as a navigation system no longer needs to recalculate a route to correct for as many navigation errors. Moreover, fewer errors also permit travel by user 220 to be more efficient, as the user does not need to backtrack from as many user errors. Additionally, embodiments of the present invention offer a solution to user navigation confusion, thereby making navigation of the vehicle less stressful for the user. In some instances, this can also promote fewer accidents and reduce the risk the user poses to himself/herself and to others.

Figure 2:
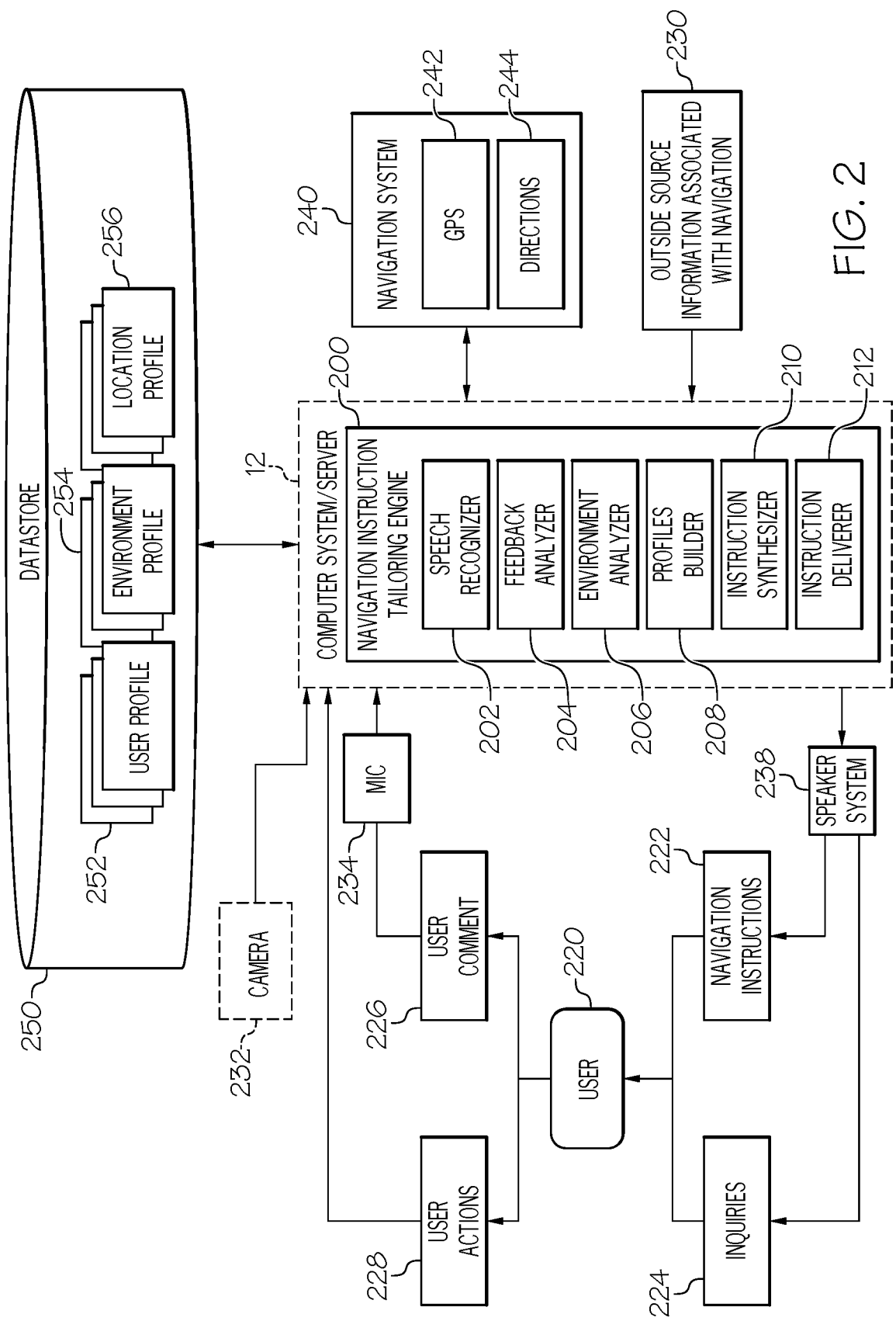
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment). A stand-alone computer system/server 12 is shown in FIG. 2 for illustrative purposes only. In the event the teachings recited herein are practiced in a networked computing environment, each client need not have a navigation instruction tailoring engine 200 (hereinafter "system 200"). Rather, all or part of system 200 could be loaded on a server or server-capable device that communicates (e.g., wirelessly) with the clients to provide for improving electronic navigation for a user operating a vehicle based on feedback from the user. Regardless, as depicted, system 200 is shown within computer system/server 12. In general, system 200 can be implemented as program/utility 40 on computer system 12 of FIG. 1 and can enable the functions recited herein.

Along these lines, system 200 may perform multiple functions similar to a general-purpose computer. Specifically, among other functions, system 200 can improve electronic navigation for a user operating a vehicle based on feedback from the user in a networked computing environment. To accomplish this, system 200 can include a set of components (e.g., program modules 42 of FIG. 1) for carrying out embodiments of the present invention. These components can include, but are not limited to, speech recognizer 202, feedback analyzer 204, environment analyzer 206, profiles builder 208, instruction synthesizer 210, and instruction deliver 212.

Through computer system/server 12, system 200 can output navigation instructions 222 and learning inquiries 224 (e.g., via speaker system 238) to user 220 of system 200, who may be operating a vehicle. Through computer system/server 12, system 200 can obtain from user 220 user feedback, including comment 226 (e.g., verbal comments), via microphone 234, as well as detected user feedback, including user actions 228 with respect to the navigation of the vehicle, via GPS location 242. Furthermore, through computer system/server 12, system 200 can optionally be in communication with or receive visual or auditory information from camera 232. Camera 232 can, in some embodiments, be a component of computer system/server 12 and can include any video/audio device, such as, but not limited to, a camera attached to the vehicle (e.g., dashboard, built-in), smart glasses worn by user 220, public cameras and live image feeds (e.g., traffic camera), or personal computing devices (e.g., mobile phones). Additionally, through computer system/server 12, system 200 can obtain information associated with navigation 230 from outside sources, such as an online resource offering information about current driving conditions or weather conditions.

System 200 can also be in communication with datastore 250, in which system 200 can store profiles associated with navigation of the vehicle, including one or more user profiles 252, each describing navigation techniques specific to one or more users 220; ambient environment profile 254, describing current conditions surrounding operation of the vehicle by user 220; and location profiles 256 describing navigation techniques specific to particular locations. In some embodiments, datastore 250 can be storage system 32 of computer system/server 12. In some other embodiments, datastore 250 can be a separate storage.

System 200 can also be in communication with navigation system 240 and can obtain navigation directions 244 and GPS location 242 from navigation system 240. Although shown as distinct from computer system/server 12 in FIG. 2, in some embodiments navigation system 240 can reside on computer system/server 12 or on a computer system/server (e.g., a mobile device carried by user 220) having similar attributes as computer system/server 12 as described above with respect to FIG. 1. Furthermore, although also shown as distinct from system 200 in FIG. 2, in some embodiments navigation system 240 can be program/utility 40 of computer system 12 with system 200 being a component (e.g., program module 42 of FIG. 1) of navigation system 240.

According to some embodiments of the present invention, system 200 can receive a request for navigation instructions from user 220. This request may include a destination to which user 220 would like to navigate. This request may also include, in some cases, a description of a mode of transportation for user 220, such as driving, biking, or walking. System 200 can send this request to navigation system 240, at which GPS location 242 of user 220 or the vehicle operated by user 220 may be determined by a GPS navigation system, a route may be calculated, and navigation directions 244 for the calculated route may be assembled. System 200 can then obtain these assembled directions 244 from navigation system 240. System 200 can also obtain GPS location 242 of user 220 from navigation system 240. In some other embodiments of the present invention, system 200 can obtain navigation directions 244 and GPS location 242 of user 220 from navigation system 240, without first receiving a request for navigation instructions from user 220. In this case, navigation system 240, or any other system, may receive the request and push navigation directions 244 to system 200 once navigation system 240 has determined GPS location 242 of user 220 or the vehicle, calculated a route, and assembled navigation directions 244 for the route. In any case, system 200 can obtain navigation directions 244 from navigation system 240.

Speech recognizer 202 of system 200, as performed by computer system/server 12, can obtain verbal comment 226 from user 220 via microphone 234 or any other audio receiving device. Such verbal comments may include commentary on navigation instructions currently being provided to user 220, such as "I'm color blind; I can't tell red from green," "Those dark-colored street signs are so hard to read at night," or "Thank goodness, I can see that." Speech recognizer 202 can use any speech recognition technique now known or later developed to identify words or phrases in spoken language and to convert these to a machine-readable format. Speech recognizer 202 can further be configured to distinguish speech of user 220 (e.g., based on a profile of the user's voice) from other sounds or voices (e.g., sounds from a radio or sound system). In some embodiments, speech recognizer 202 can be configured to listen to only user 220, even if there are other passengers in the vehicle. In some other embodiments, speech recognizer 202 can be configured to listen to anyone in the vehicle.

It should be understood that although primarily discussed herein with respect to the operation of a vehicle, embodiments of the present invention and system 200 can be used in association with any mode of transportation. Such modes of transportation can include, but are not limited to: walking, biking, and public transportation. For instance, embodiments of the present invention could be used to identify a train or bus that a user should take or a bus/train stop at which a user should disembark.

Figure 3:
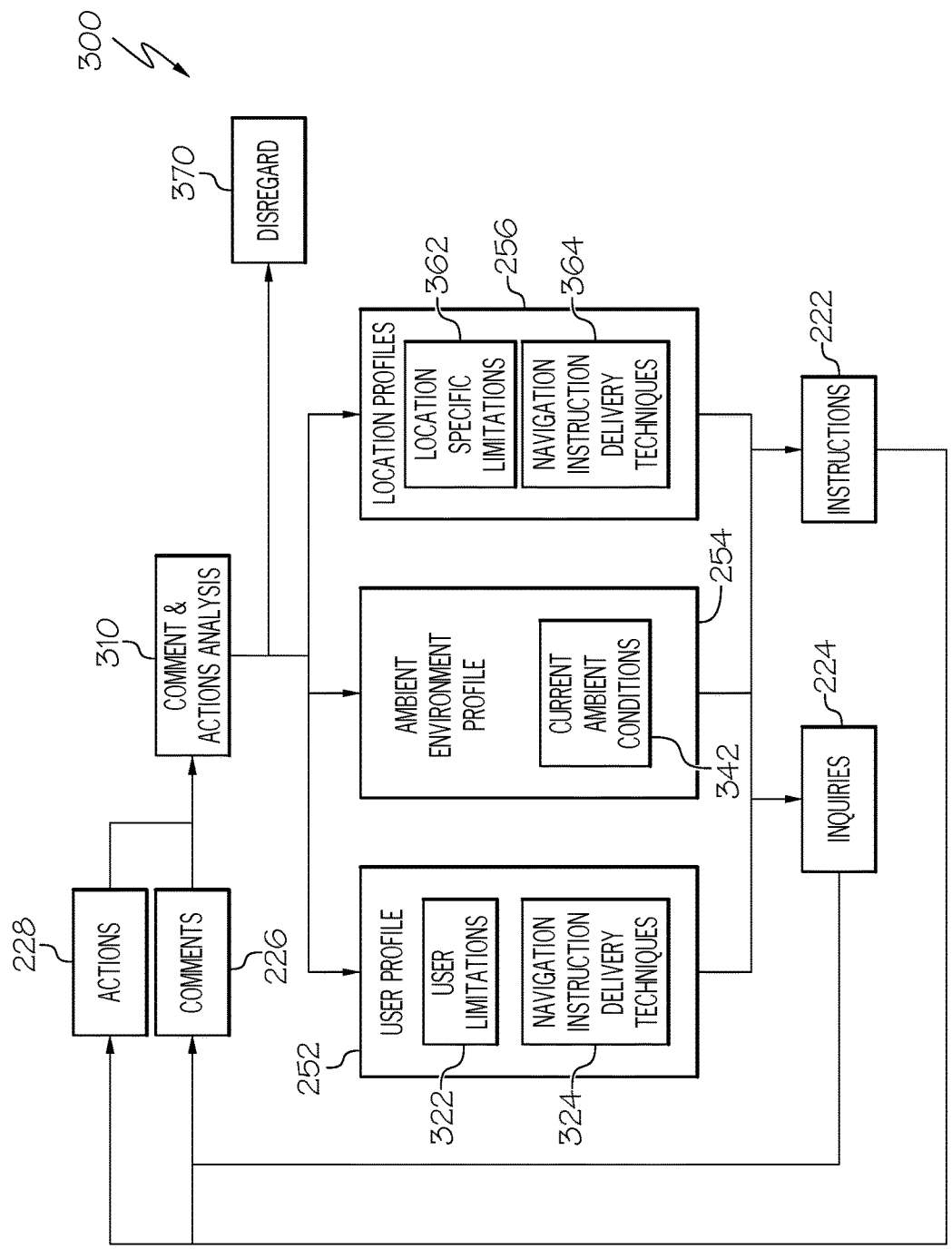
FIG. 3 shows building and modifying profiles based on feedback from a user according to illustrative embodiments.

Referring now to FIG. 3 in connection with FIG. 2, building and modifying 300 profiles 252, 254, and/or 256 associated with navigation of the vehicle operated by user 220 based on feedback from user 220 according to illustrative embodiments is shown. Feedback analyzer 204 of system 200, as performed by computer system/server 12, can analyze verbal comment 226 for a navigation instruction delivery preference by performing comment and action analysis 310. Feedback analyzer 204 can use any natural language cognition technique now known or later developed to skim comment 226 for content relevant to the ongoing navigation of the vehicle by user 220 based on navigation instructions 222 outputted to user 220. Feedback analyzer 204 can identify this content as individual knowledge objects. Knowledge object can be a navigation instruction delivery preference (e.g., user 220 likes receiving navigation instructions 222 with reference to the color of physical objects) or a condition associated with a navigation instruction delivery preference (e.g., 'it is dark out' is associated with preferences of user 220 at night). For example, feedback analyzer 204 can identify the statement, "I'm color blind; I can't tell red from green," from user 220 as containing the knowledge object: the user 220 cannot understand navigation instructions referencing the colors red or green. In a further example, feedback analyzer 204 can identify the statement, "Those dark-colored street signs are so hard to read at night," from user 220 as containing the knowledge objects: the street signs are dark, it is currently night, and in the current environment user 220 cannot use navigation instructions that reference street names.

In some embodiments, feedback analyzer 204 can also identify comments 226 that do not contain any content relevant to the ongoing navigation of the vehicle by user 220. This can be based, for example, on a lack of any keyword associated with navigation of the vehicle, or any other technique now known or later discovered for gauging the relevancy of natural language. In any case, feedback analyzer 204 can assign disregard label 370 on any comment determined not to be relevant, and, by doing so, ignore the comment.

In some embodiments of the present invention, feedback analyzer 204 can also identify and interpret knowledge objects from vehicle operation actions 228 of user 220. As system 200 provides navigation instructions 222 to user 220, feedback analyzer 204 can follow a progress of the vehicle using GPS location 242 in real time as provided by navigation system 240. When feedback analyzer 204 determines from GPS location 242 that user 220 has diverged from navigation instructions 222 (e.g., missed turn, took wrong street), feedback analyzer 204 can identify the navigation instruction that user 220 failed to follow and attribute to action 228 the knowledge object that the particular navigation instruction contains a navigation instruction delivery technique that failed. For example, if feedback analyzer 204 determines that user 220 did not follow the instruction, "Turn where the white car just turned," then this action indicates the knowledge object: instructing user to follow another vehicle has failed. Furthermore, feedback analyzer 204 can determine when operation/driving of the vehicle become atypical and derive a knowledge object from that. For example, if feedback analyzer 204 determines, based on GPS location 242 that user 220 is driving significantly slower than is typical for user 220 and/or the street on which user 220 is operating the vehicle, then feedback analyzer 204 can attribute to this action the knowledge object that user 220 is confused or does not understand a navigation instruction.

In some embodiments, feedback analyzer 204 can determine that comment 226 from user 220 does not contain a sufficient information content to create a knowledge object. Feedback analyzer 204 can make this determination, for example, in the case that feedback analyzer 204 is unable to determine from comment 226 a reason that the user is confused, does not understand, or otherwise cannot follow navigation instructions 222. In response to a determination that comment 226 does not contain sufficient information, feedback analyzer 204 can synthesize inquiry 224 to solicit additional information from user 220. This question can take a variety of forms, such as a generic-preprogramed question to start a dialogue with user 220 (e.g., Why? What do you mean? Tell me more.). In some embodiments, feedback analyzer 204 can configure inquiry 224 to solicit user 220 to elaborate on a specific part of his or her previous comment 226 (e.g., What makes the sign difficult to read?). Feedback analyzer 204 can synthesize inquiry 224 using any technique now known or later developed to permit a computer system to converse with a user in a natural language. In some embodiments, feedback analyzer 204 can pursue a dialogue between system 200 and user 220 for several rounds of inquiry 224 and comment 226. In some embodiments, feedback analyzer 204 can continue the dialogue until feedback analyzer 204 receives sufficient information from user 220 to create a knowledge object. In further embodiments, feedback analyzer 204 can continue the dialogue until user 220 indicates that he or she has no further information to give system 200.

This dialogue between user 220 and system 200 addresses a need in the art because current navigation systems fail to provide drivers with an opportunity to provide feedback during a drive, let alone actively seek feedback information from drivers. By comparison, the back and forth dialogue between user 220 and system 200 according to embodiments of the present invention can be used to diagnose specific problems with navigation instructions 222 as those instructions are being provided. This allows those navigation instructions to be actively improved, both for user 220 specifically and for other users of system 200.

In some embodiments, but not all, system 200 can also include environment analyzer 206. Environment analyzer 206, as performed by computer system/server 12, can obtain information 230 associated with navigation from sources other than navigation system 240 and user 220 and identify the obtained information as knowledge objects. These sources may include third-party information providing resources or services, such as services providing current weather conditions (e.g., the National Weather Service), current road conditions (e.g., Waze (Waze is a registered trademark of Google Inc.)), or current light conditions for GPS location 242 of the vehicle (e.g., dawn, day, dusk, night). Environment analyzer 206 can organize information from these sources into knowledge objects (e.g., it is currently dusk and raining). Environment analyzer 206 can also or alternatively obtain audio/visual data on the environment immediately surrounding the vehicle operated by user 220 through camera 232 attached to the vehicle or associated with the user and directed facing out of the vehicle. Environment analyzer 206 can analyze images captured by camera 232 using any object recognition technology now known or later developed. From this analysis, environment analyzer 206 can identify real objects in the immediate vicinity of the vehicle operated by user 220, such as buildings, other vehicles, and road, weather and light conditions and treat these identified real objects as knowledge objects (e.g., there is a coffee shop at the corner of the next turn).

Profiles builder 208, as performed by computer system/server 12, can build and modify a profile associated with navigation of the vehicle based on a navigation instruction delivery preference. Profiles builder 208 can organize knowledge objects, identified by feedback analyzer 204, and, in embodiments that include it, environment analyzer 206, into profiles 252, 254, and 256 based on an association of the content of the knowledge object with user 220, the ambient environment surrounding the vehicle operated by user 220, or the actual location of the vehicle operated by user 220. In some cases, a knowledge object can be sorted into more than one profile. For example, the knowledge object "user 220 cannot understand navigation instructions referencing the colors red or green" is associated with user 220, and therefore is placed in user profile 252. The knowledge objects "the street signs are dark colored" and "the street signs are too dark to read at night" are associated with the actual location of the vehicle operated by user 220, and therefore are placed in location profile 256. Meanwhile, the knowledge objects "it is currently night" and "in the current environment user 220 cannot use navigation instructions that reference street names" are placed in ambient environment surrounding 254. Although three profile categories are discussed as depicted in the Figures and discussed here, it should be understood that some embodiments of the present invention can have more or fewer profile categories. For example, in some embodiments, profile builder 208 can build and modify only user profiles 252.

Looking now at user profile 252, profile builder 208 can assemble information about limitations 322 of user 220 that feedback analyzer 204 identified as relevant to the ongoing navigation of the vehicle by user 220. Examples of user limitations 322 can include physical limitations of user 220 (e.g., user is colorblind, user has poor night vision, user struggles to read font below a certain size, etc.) and understanding limitations of user 220 (e.g., user has difficulty estimating distances, user cannot read language in which signs are written, etc.). User limitations 322 can also include areas in which user 220 had a proficient understanding and/or is physically able (e.g., user can readily identify makes and models of other vehicles).

Based on limitations 322 of user 220 and other knowledge objects that feedback analyzer 204 identified as relevant to user 220 and/or as navigation instruction delivery preferences, profile builder 208 can accumulate a pool of navigation instruction delivery techniques 324. Within this pool of delivery techniques 324, profile builder 208 can organize delivery techniques 324 according to a success or failure of delivery techniques 324. In some embodiments, this organization can be in the form of a list that ranks or scores delivery techniques 324 from most to least successful, or vice versa. Methodologies used to score navigation instruction delivery techniques 324 can include a scoring system that awards points when user 220 successfully follows a navigation instruction delivered using that particular navigation instruction delivery technique 324, and deducts points when user 220 fails to follow a navigation instruction delivered using that particular navigation instruction delivery technique 324. In some embodiments, profile builder 208 can also tie the use of some navigation instruction delivery techniques 324 to whether certain conditions are met or not. For example, if user 220 only has difficulty reading signs at night, then a navigation instruction delivery technique that references street signs would be muted from the scored/ranked pool when the condition of nighttime is satisfied, and active in the pool when the condition of daytime is satisfied. Therefore, the pool of navigation instruction delivery techniques 324 can be a semi-hierarchical web in which a best option, followed by a next best option, is given preference based on a set of circumstances.

Profile builder 208 can continuously update and modify user profile 252 while user 220 is operating the vehicle. For example, user profile 252 may indicate that on previous trips, providing street names to user 220 was a successful navigation instruction delivery technique 324, however, when user 220 comments to system 200 that street signs look fuzzy to her, profile builder 208 can decrease the rank/score of using street signs as a delivery technique. This allows system 200 to identify failed navigation instruction delivery techniques 324 in real time and adapt delivery of navigation instructions 222 to select a delivery technique 324 that user 220 is more likely to be able to understand and follow. Further, this addresses the current problem in the art of a vehicle operator failing to be able to follow a navigation instruction, only for a navigation system to continue to deliver instructions to the vehicle operator in the same manner.

Although only one user profile 252 is shown in FIG. 3, it should be understood that in some embodiments, profile builder 208 can create a user profile 252 for each of a multitude of users. In some embodiments, as one of a group of different users 220 initiate operation of a vehicle, system 200 can identify which user 220 is currently operating the vehicle. This can be accomplished, for example, by a voice recognition capability of system 200 or by system 200 receiving user input, such as a selection by the current user of a user identify from a plurality of user identities. System 200 can then load profile 252 corresponding with that user identity (e.g., from storage 34 of computer system/server 12 or from datastore 250) and, as the current user 220 operates the vehicle, tailor directions 244 according to that profile 252 and further modify that profile 252 based on feedback from that user 220. When a second, different user 220 initiates operation of the vehicle, system 200 can identify that second user 220 and instead load his/her user profile 252. Therefore, profile builder 208 can create a plurality of user profiles 252, each corresponding to a different user of a plurality of users. In some embodiments of the present invention, more than one instance of system 200 can access a pool of user profiles 252 stored in datastore 250. For example, a first instance of system 200 residing on a first computer system/server 12 of a first vehicle can be used to provide user 220 operating the first vehicle with navigation instructions 222 based on user profile 252 corresponding to that particular user. When user 220 subsequently attempts to operate a second vehicle having a second computer system/server 12 on which a second instance of system 200 resides, the second instance of system 200 can identify the user as the same user and load the same user profile 252 corresponding to that particular user. Furthermore, in the case that computer system/server 12, of which system 200 is a part, is a portable device or computer system, or is otherwise portable, computer system/server 12 (and therefore system 200) can be transplanted from a first vehicle into a second vehicle, and therefore used in multiple vehicles. Accordingly, in some embodiments user 220 can transfer system 200 to other vehicles, and, if a vehicle has multiple drivers, system 200 can be used with multiple users.

Looking now at ambient environment profile 254, in some embodiments profile builder 208 can assemble a temporary profile of current ambient conditions from the knowledge objects that feedback analyzer 204 identified as associated with the ambient environment surrounding the vehicle operated by user 220 and the knowledge objects identified by environment analyzer 206, in embodiments that include environment analyzer 206. Ambient environment profile 254 can include current road, weather, and light conditions, which instruction synthesizer 210 (discussed below with reference to FIG. 4) can apply to ranked/scored navigation instruction delivery techniques 324, thereby making a candidate or muting certain delivery techniques 324 when selecting a navigation instruction delivery technique 324 to use. Ambient environment profile 254 can also, in some embodiments, include descriptions of physical objects currently in view around the vehicle of user 220, such as buildings (e.g., brand name gas station, brand name eatery), other vehicles (e.g., color, make, model, age plate number or state, other identifying characteristics), pedestrians (e.g., age, height), and other physical objects (e.g., trees). These descriptions of physical objects currently in view can be used by instruction synthesizer 210, as discussed further below, to provide points of reference when synthesizing instructions. As the environment around a vehicle can rapidly change, profile builder 208 can add new content and remove obsolete content from ambient environment profile 254 dynamically.

Looking now at location profiles 256, profile builder 208 can assemble information about location specific limitations 362 of a particular location that feedback analyzer 204 identified as relevant to the ongoing navigation of the vehicle by user 220. Examples of location specific limitations 362 can include missing, incorrect, or obscured signage (e.g., street sign blocked by a tree), confusing intersections and other transition areas (e.g., a six-way intersection), or any other obstacle that has caused multiple drivers to fail to follow a navigation instruction. Location specific limitations 362 can also include features of locations that make navigation instructions including that feature highly successful for that location (e.g., referencing a 10-foot-tall pink elephant statue). As location profiles 256 are each specifically tied to a location, profiles 256 are not limited to use by one user 220. Rather location profiles 256 can be accessed by many instances of system 200 being used by different users 220, and therefore can be stored on a network database (e.g., datastore 250) for accessibility by instances of system 200. Moreover, location profiles 256 can be built cumulatively by multiple instances of profile builder 208 as part of multiple instances of system 200 associated with multiple users 220.

Based on limitations 362 of a particular location and other knowledge objects that feedback analyzer 204 identified as relevant to the location and/or as navigation instruction delivery preferences, profile builder 208 can accumulate a pool of navigation instruction delivery techniques 324 for the particular location. Within this location pool of delivery techniques 324, profile builder 208 can organize delivery techniques 324 according to a success or failure of delivery techniques 324 at the particular location. In some embodiments, this organization can be in the form of a list that ranks or scores delivery techniques 324 from most to least successful, or vice versa. Methodologies used to score navigation instruction delivery techniques 324 can include a scoring system that awards points when a user 220 (of a group of users using instances of system 200) successfully follows a navigation instruction delivered using that particular navigation instruction delivery technique 324 at the location and deducts points when a user 220 (of the group of users) fails to follow a navigation instruction delivered using that particular navigation instruction delivery technique 324 at that location. In some embodiments, profile builder 208 can also tie the use of some navigation instruction delivery techniques 324 to whether certain conditions are met or not for the particular location. For example, if the street signs at the location are only difficult to read at night, then a navigation instruction delivery technique that references street signs would be muted from the scored/ranked pool for that location when the condition of nighttime is satisfied, and active in the pool when the condition of daytime is satisfied. Therefore, as above with user profile 252, the pool of navigation instruction delivery techniques 324 for the particular location can be a semi-hierarchical web in which a best option, followed by a next best option, is given preference based on a set of circumstances.

This addresses a current problem in the art where, once a diver fails to follow a navigation instruction because of an issue at the location associated with the instruction or an issue with the type of instruction given at the location, the issue remains, and other drivers, following that same route, will likely encounter the same issue and make a navigation error because of it. However, in the present invention, such repeated errors can be prevented by feedback analyzer 204 identifying the issue based on a comment from user 220 and profile builder 208 adding the issue to location profile 256 associated with that location.

Figure 4:
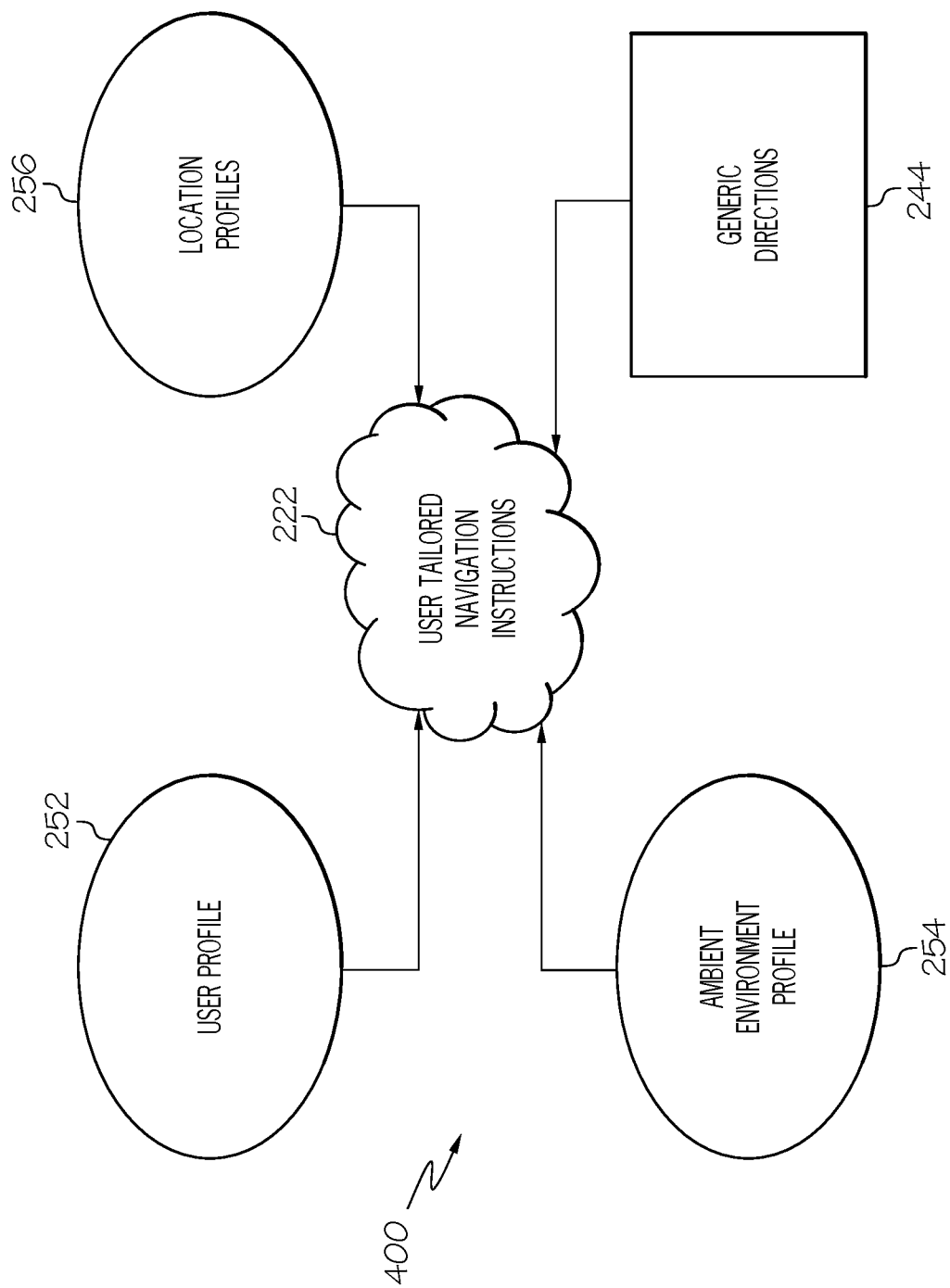
FIG. 4 shows generation of user-tailored navigation instructions according to illustrative embodiments.

Referring now to FIG. 4, in connection with FIG. 2, generation of user-tailored navigation instructions 400 is shown according to illustrative embodiments of the present invention. Instruction synthesizer 210 can synthesize navigation instruction 222 with which to provide user 220 based on profiles 252, 254, and/or 256. To accomplish this, instruction synthesizer 210 can obtain generic or default navigation directions 244 from navigation system 240. Generic navigation directions 244 may reference street names, right/left turns, distances, and geographic directions, as found in directions provided by many current navigational systems.

For each generic direction 244, instruction synthesizer 210 can aggregate the ranked navigation instruction delivery techniques 324 of user profile 252, the ranked navigation instruction delivery techniques 364 of location profile 256 for the location associated with the particular generic direction 244, and the current ambient conditions 342 of ambient environment profile 254 describing the circumstances around the vehicle of user 220. Instruction synthesizer 210 can then apply this aggregation to the particular generic direction 244 to determine an optimal navigation instruction delivery technique with which to recast generic direction 244 as tailored navigation instruction 222 for user 220. To resolve a conflict between a top ranked navigation instruction delivery techniques 324 (user profile) and a different top ranked navigation instruction delivery techniques 364 (location profile) instruction synthesizer 210 can compare a rate of success vs. failure of the conflicting techniques. This rate may be expressed as a percentage or otherwise prorated for the purpose of comparison. Instruction synthesizer 210 can then select to use the more successful navigation instruction delivery technique.

For example, assume generic direction 244 says, "Turn right on Pine Ave. in 500 feet." According to ambient environment profile 254, there is fog surrounding the vehicle operated by user 220 and a red car about to turn right on Pine Avenue. Instruction synthesizer 210 can cross-reference this weather condition against ranked navigation instruction delivery techniques 324 of user profile 252 to determine that, because user 220 has difficulty reading street signs in low lighting, the top ranked navigation instruction delivery techniques 324 is: follow a car or other lighted object. Instruction synthesizer 210 can further cross-reference the presence of the red car with the preferred navigation instruction delivery technique to determine that the optimal navigation instruction 222 with which to provide user 220 is: "follow the red car turning right." In another illustrative example of Instruction synthesizer 210 generating user tailored navigation instructions 222 based on an aggregation of profiles 252, 254, and 256, user profile 252 indicates that user 220 is colorblind, but very good at identifying cars by their make and model. Therefore, when ambient environment profile 254 indicates that a blue Acme sedan is making the same turn that user 220 needs to make according to generic directions 244, instruction synthesizer 210 can use this information to generate navigation instruction 222 telling user 220 to "follow the Acme sedan." In yet another example, assume that user profile 252 indicates that user 220 is very poor at successfully identifying landmarks and using them to navigate. However, location profile 256 for the intersection at which user 220 needs to turn left indicates that the most successful way to identify that intersection is with reference to a park on one corner of the intersection with a statue of a 10-foot-high pink elephant. Because the success rate of the pink elephant is greater than the success rate for any navigation instruction delivery technique in profile 252 of user 220, instruction synthesizer 210 generates navigation instruction 222 telling user 220 to "turn left immediately after the big pink elephant."

It should be understood that instruction synthesizer 210 can select differing navigation instruction delivery techniques for each of generic directions 244 (e.g., one navigation instruction may reference a landmark, while the next may tell the user to follow a particular car). It should also be understood that in the cases of some generic directions 244, instruction synthesizer 210 can rely on fewer than all profiles developed by profile builder 208. Furthermore, in some embodiments, ambient environment profile 254 and/or location profiles 256 are not created or developed, and instruction synthesizer 210 instead synthesizes all user tailored navigation instructions 222 from user profile 252.

Finally, instruction deliverer 212 can provide user 220 with synthesized navigation instruction 222. In some embodiments, this providing can be via audio speaker 238, which can be part of computer system/server 12 or a system connected to computer system/server 12. In some further embodiments, this providing can be via a textual display, for example, on a display screen of computer system/server 12.

Figure 5:
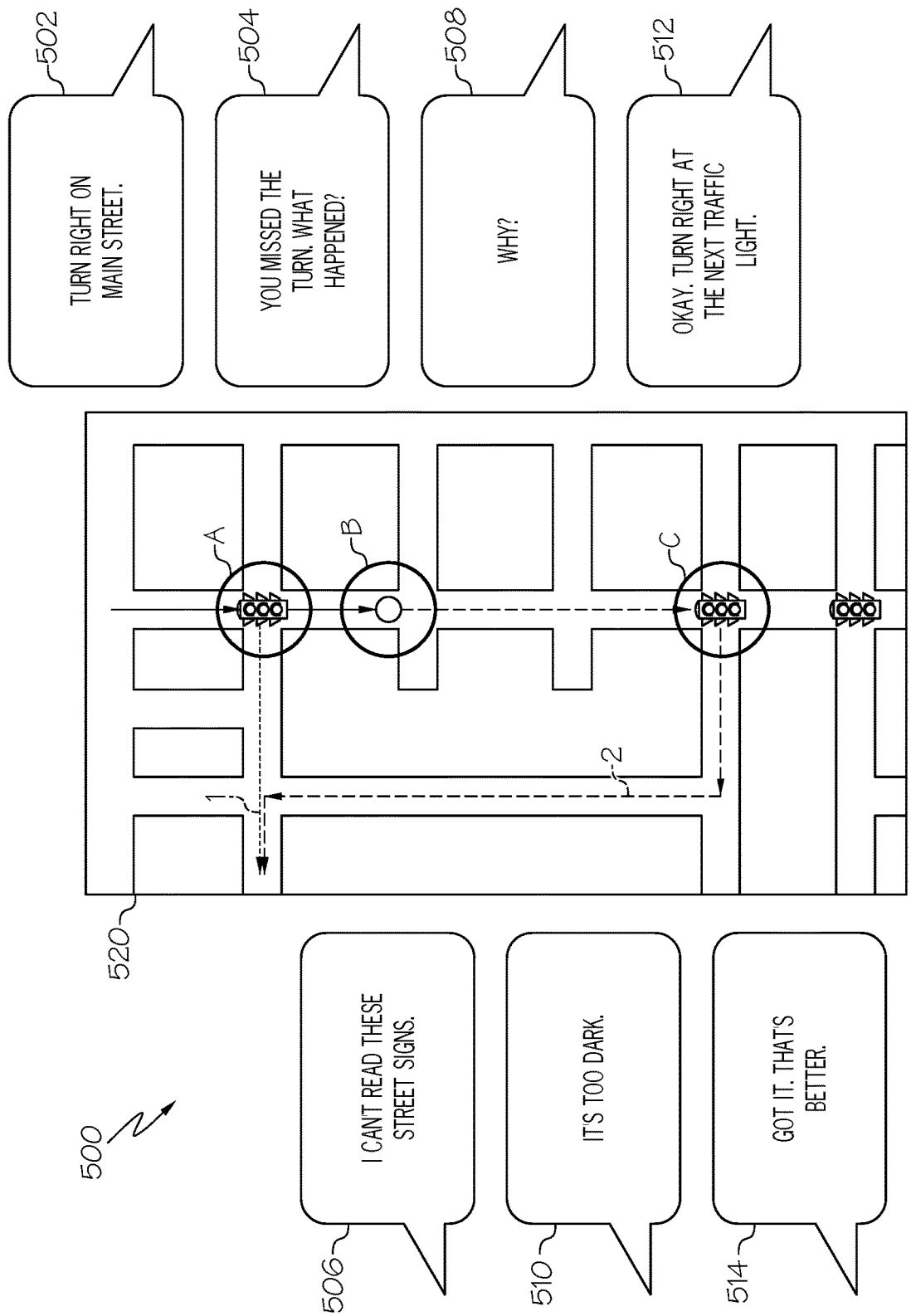
FIG. 5 shows an example implementation according to illustrative embodiments.

Referring now to FIG. 5, example implementation 500 according to illustrative embodiments is shown. As shown on map 520, user 220 is driving a car down North Street, when system 200 outputs navigation instruction 502 to user 220, instructing user 220 to, "Turn right on Main Street" at location A. As user 220 continues along North Street to location B, feedback analyzer 204 determines that GPS location 242 associated with user 220 is not following route (1) of navigation directions 244 from navigation system 240. In response to user action 228 indicating that user 220 failed to carry out navigation instruction 502, feedback analyzer formulates inquiry 504 to prompt user 220 to tell system 200 why user 220 failed to understand navigation instruction 502: "You missed the turn. What happened?."

In response to inquiry 504, user 220 offers reply 506, "I can't read these street signs." Speech recognizer 202 receives and feedback analyzer 204 analyzes response 506. Based on this analysis, feedback analyzer 204 determines there is insufficient information in response 506 to indicate a particular issue with the street signs or the environment, or a limitation of user 220. Therefore, responsive to reply 506, feedback analyzer 204 formulates another inquiry 508 to prompt user 220 to tell system 200 additional information about why user 220 failed to understand navigation instruction 502: "Why?".

In response to inquiry 508, user 220 clarifies the issue with reply 510, "It's too dark." Speech recognizer 202 receives and feedback analyzer 204 analyzes response 510. Based on this analysis, feedback analyzer 204 determines there is sufficient information in response 510 to describe the issue with the street signs, the environment, and user 220. Accordingly, feedback analyzer 204 creates the following knowledge objects: "user 220 has trouble seeing street signs at night," "it is night," and "street signs at location A are hard to see at night." Profile builder 208 assigns the first knowledge object to user profile 252, where it is entered as a limitation of user 220 and points are removed from the navigation instruction delivery technique that provides navigation instructions using street signs at night. Likewise, profile builder 208 assigns the third knowledge object to location profile 256 of location A, where it is entered as a limitation of location A and points are removed from the navigation instruction delivery technique that provides navigation instructions using street signs at night. Profile builder 208 assigns the second knowledge object to ambient environment profile 254, where it is noted that it is nighttime and it is dark outside.

Based on these updated profiles, instruction synthesizer 210 can select a navigation instruction delivery technique that references lighted objects in the vicinity of user 220. Accordingly, instruction synthesizer 210 can generate navigation instruction 512, referring to the brightly lit stoplight ahead at location C, and guide user 220 to alternative route (2).

In reply 514, user 220 acknowledges that this navigation instruction delivery technique is preferable. Based on the feedback in reply 514 and/or the successful completion of navigation instruction 512, feedback analyzer 204 creates the following knowledge objects: "user 220 responds well to brightly lit objects at night," and "at locations A and C, refer to traffic light, not the street names at night," which are then added to user profile 252 of user 220 and location profile 256 of locations A and C, respectively. By this process, these profiles are more specially tailored and can be used in the future to produce better user-tailored navigation instructions.

Figure 6:
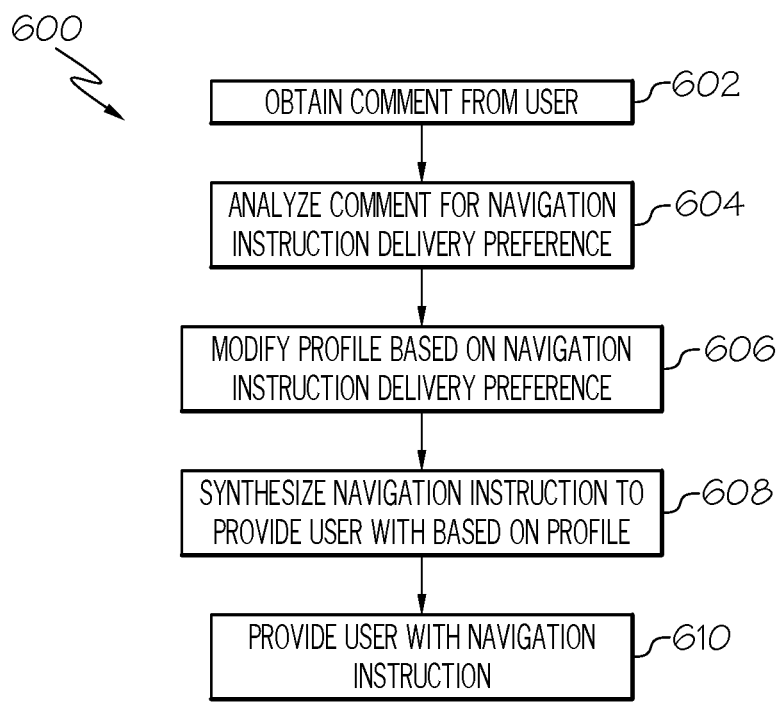
FIG. 6 shows a process flowchart for improving electronic navigation for a user operating a vehicle based on feedback from the user according to illustrative embodiments.

As depicted in FIG. 6, in one embodiment, a system (e.g., computer system/server 12) carries out the methodologies disclosed herein. Shown is a process flowchart 600 for improving electronic (e.g., GPS) navigation for a user operating a vehicle based on feedback from the user. At 602, speech recognizer 202 obtains a verbal comment 226 from user 220. At 604, feedback analyzer 204 analyzes the verbal comment 226 for a navigation instruction delivery 324 or 364 preference. At 606, profile builder 208 modifies a profile 252, 254, or 256 associated with navigation of the vehicle based on the navigation instruction delivery 324 or 364 preference. At 608, instruction synthesizer 210 synthesizes a navigation instruction 222 with which to provide the user 220 based on the profile 252, 254, or 256. At 610, instruction deliverer 212 provides the user 220 with the synthesized navigation instruction 222.

Process flowchart 600 of FIG. 6 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for improving electronic navigation for a user operating a vehicle based on feedback from the user. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for improving electronic navigation for a user operating a vehicle based on feedback from the user. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to improve electronic navigation for a user operating a vehicle based on feedback from the user. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for improving electronic navigation for a user operating a vehicle based on feedback from the user, the method comprising:
    detecting a deviation by the user from navigation instructions having a delivery technique;
    generating, responsive to the navigation instructions deviation, a communication to the user inquiring why the user deviated from the navigation instructions;
    obtaining a verbal comment from the user;
    analyzing the verbal comment for sufficient information to determine a reason for failure of the navigation instruction delivery technique;
    generating, responsive to the verbal comment containing insufficient information, a clarifying communication to the user prompting the user to elaborate on the verbal comment;
    obtaining, responsive to the clarifying communication, a second verbal comment from the user;
    analyzing the verbal comments for the reason for failure of the navigation instruction delivery technique;
    modifying a profile associated with navigation of the vehicle with a navigation instruction delivery preference responsive to the reason;
    synthesizing a navigation instruction with which to provide the user based on the profile; and
    providing the user with the synthesized navigation instruction.

2. The method of claim 1, the method further comprising synthesizing an inquiry directed at the user responsive to an action of the user, the action associated with the provided navigation instruction.

3. The method of claim 2, the method further comprising:
    obtaining a response from the user responsive to the inquiry;
    modifying the profile associated with navigation of the vehicle by the user based on the response.

4. The method of claim 1, the navigation instruction delivery preference comprising a limitation of the user or a limitation of an environment in which the vehicle operated by the user is situated.

5. The method of claim 4, the method further comprising adding the limitation of the user to the profile associated with navigation of the vehicle by the user, the profile being a profile associated with the user.

6. The method of claim 4, the method further comprising:
    determining whether the limitation of the environment is a continuing limitation of the environment or a temporary limitation of the environment;
    adding, in the case that the limitation of the environment is a continuing limitation of the environment, the limitation of the environment to the profile associated with navigation of the vehicle by the user, the profile being a location profile associated with a current location of the user, and the location profile being stored in association with the environment; and
    adding, in the case that the limitation of the environment is a temporary limitation of the environment, the limitation of the environment to the profile associated with navigation of the vehicle by the user, the profile being an ambient environment profile associated with a current environment of the user, the ambient environment profile being created temporarily for an instance of operation of the vehicle by the user.

7. The method of claim 1, the method further comprising:
    obtaining visual information in real time about an environment in which the vehicle operated by the user is situated;
    adding the obtained visual information to the profile associated with navigation of the vehicle; and
    referencing the obtained visual information in the synthesized navigation instruction.

8. A computer system for improving electronic navigation for a user operating a vehicle based on feedback from the user, the computer system comprising:
    a memory medium comprising program instructions;
    a bus coupled to the memory medium; and a processor, for executing the program instructions, coupled to a navigation instruction tailoring engine via the bus that when executing the program instructions causes the system to:

detect a deviation by the user from navigation instructions having a delivery technique;

generate, responsive to the navigation instructions deviation, a communication to the user inquiring why the user deviated from the navigation instructions;

obtain a verbal comment from the user;

analyze the verbal comment for sufficient information to determine a reason for failure of the navigation instruction delivery technique;

generate, responsive to the verbal comment containing insufficient information, a clarifying communication to the user prompting the user to elaborate on the verbal comment;

obtain, responsive to the clarifying communication, a second verbal comment from the user;

analyze the verbal comments for the reason for failure of the navigation instruction delivery technique;

modify a profile associated with navigation of the vehicle with a navigation instruction delivery preference responsive to the reason;

synthesize a navigation instruction with which to provide the user based on the profile; and provide the user with the synthesized navigation instruction.

9. The computer system of claim 8, the instructions further causing the system to synthesize an inquiry directed at the user responsive to an action of the user, the action associated with the provided navigation instruction.

10. The computer system of claim 9, the instructions further causing the system to:

obtain a response from the user responsive to the inquiry;

modify the profile associated with navigation of the vehicle by the user based on the response.

11. The computer system of claim 8, the navigation instruction delivery preference comprising a limitation of the user or a limitation of an environment in which the vehicle operated by the user is situated.

12. The computer system of claim 11, the instructions further causing the system to add the limitation of the user to the profile associated with navigation of the vehicle by the user, the profile being a profile associated with the user.

13. The computer system of claim 11, the instructions further causing the system to:

determine whether the limitation of the environment is a continuing limitation of the environment or a temporary limitation of the environment;

add, in the case that the limitation of the environment is a continuing limitation of the environment, the limitation of the environment to the profile associated with navigation of the vehicle by the user, the profile being a location profile associated with a current location of the user, and the location profile being stored in association with the environment; and add, in the case that the limitation of the environment is a temporary limitation of the environment, the limitation of the environment to the profile associated with navigation of the vehicle by the user, the profile being an ambient environment profile associated with a current environment of the user, the ambient environment profile being created temporarily for an instance of operation of the vehicle by the user.

14. The computer system of claim 8, the instructions further causing the system to:

obtain visual information in real time about an environment in which the vehicle operated by the user is situated;

add the obtained visual information to the profile associated with navigation of the vehicle; and reference the obtained visual information in the synthesized navigation instruction.

15. A computer program product for improving electronic navigation for a user operating a vehicle based on feedback from the user, the computer program product comprising a computer readable hardware storage device, and program instructions stored on the computer readable hardware storage device, to:

detect a deviation by the user from navigation instructions having a delivery technique;

generate, responsive to the navigation instructions deviation, a communication to the user inquiring why the user deviated from the navigation instructions;

obtain a verbal comment from the user;

analyze the verbal comment for sufficient information to determine a reason for failure of the navigation instruction delivery technique;

generate, responsive to the verbal comment containing insufficient information, a clarifying communication to the user prompting the user to elaborate on the verbal comment;

obtain, responsive to the clarifying communication, a second verbal comment from the user;

analyze the verbal comments for the reason for failure of the navigation instruction delivery technique;

modify a profile associated with navigation of the vehicle with a navigation instruction delivery preference responsive to the reason;

synthesize a navigation instruction with which to provide the user based on the profile; and provide the user with the synthesized navigation instruction.

16. The computer program product of claim 8, the computer readable storage device further comprising instructions to synthesize an inquiry directed at the user responsive to an action of the user, the action associated with the provided navigation instruction.

17. The computer program product of claim 15, the computer readable storage device further comprising instructions to:

obtain a response from the user responsive to the inquiry;

modify the profile associated with navigation of the vehicle by the user based on the response.

18. The computer program product of claim 15, the navigation instruction delivery preference comprising a limitation of the user and the computer readable storage device further comprising instructions to add the limitation of the user to the profile associated with navigation of the vehicle by the user, the profile being a profile associated with the user.

19. The computer program product of claim 15, the navigation instruction delivery preference comprising a limitation of an environment in which the vehicle operated by the user is situated and the computer readable storage device further comprising instructions to:

determine whether the limitation of the environment is a continuing limitation of the environment or a temporary limitation of the environment;

add, in the case that the limitation of the environment is a continuing limitation of the environment, the limitation of the environment to the profile associated with navigation of the vehicle by the user, the profile being a location profile associated with a current location of the user, and the location profile being stored in association with the environment; and add, in the case that the limitation of the environment is a temporary limitation of the environment, the limitation of the environment to the profile associated with navigation of the vehicle by the user, the profile being an ambient environment profile associated with a current environment of the user, the ambient environment profile being created temporarily for an instance of operation of the vehicle by the user.

20. The computer program product of claim 15, the computer readable storage device further comprising instructions to:

obtain visual information in real time about an environment in which the vehicle operated by the user is situated;

add the obtained visual information to the profile associated with navigation of the vehicle; and reference the obtained visual information in the synthesized navigation instruction.

* * * * *